United States Patent [19]
Hammond

[11] Patent Number: 5,299,667
[45] Date of Patent: Apr. 5, 1994

[54] CARBON COMPOSITE LAMINATED STRUCTURE

[75] Inventor: Charles P. Hammond, Leicester, Great Britain

[73] Assignee: Dunlop Limited, a British Company, United Kingdom

[21] Appl. No.: 807,832

[22] PCT Filed: Jul. 19, 1990

[86] PCT No.: PCT/GB90/01113
§ 371 Date: Jan. 22, 1992
§ 102(e) Date: Jan. 22, 1992

[87] PCT Pub. No.: WO91/01456
PCT Pub. Date: Feb. 7, 1991

[30] Foreign Application Priority Data
Jul. 22, 1989 [GB] United Kingdom ............... 8916822

[51] Int. Cl.⁵ ............... F16D 65/12; F16D 69/04; F16D 13/64
[52] U.S. Cl. ............... 188/218; 411/501
[58] Field of Search ......... 188/251 R, 251 A, 257 M, 188/218 XL; 192/107 M; 29/402.01, 402.09, 402.14; 411/501

[56] References Cited
U.S. PATENT DOCUMENTS

| | | | |
|---|---|---|---|
| 357,118 | 2/1887 | Dion | 411/501 |
| 2,562,721 | 7/1951 | Jakosky | 411/501 X |
| 3,212,427 | 1/1973 | Cook et al. | 188/218 XL |
| 3,724,613 | 4/1973 | Bermingham | 188/257 MX |
| 3,724,614 | 4/1973 | Bender | |
| 3,804,213 | 4/1974 | Lucien et al. | 188/218 XL |
| 4,043,437 | 8/1977 | Taylor | 188/218 XL |
| 4,146,118 | 3/1979 | Zankl | |
| 4,580,673 | 4/1986 | Graton | 188/218 XL |
| 4,982,818 | 1/1991 | Pigford | 188/218 XL |

FOREIGN PATENT DOCUMENTS

| | | |
|---|---|---|
| 0239431 | 9/1987 | European Pat. Off. . |
| 0327476 | 8/1989 | European Pat. Off. . |
| 2418024 | 10/1974 | Fed. Rep. of Germany ... 188/251 A |
| 1500824 | 10/1967 | France ............ 188/218 XL |
| 2094577 | 2/1972 | France . |
| 2531156 | 2/1984 | France ................ 411/501 |
| 2620499 | 3/1989 | France . |
| WO80/00735 | 4/1980 | PCT Int'l Appl. . |
| 557537 | 11/1943 | United Kingdom .......... 188/251 M |
| 568795 | 4/1945 | United Kingdom .......... 188/251 M |
| 1290645 | 9/1972 | United Kingdom . |
| 1317880 | 5/1973 | United Kingdom . |
| 1349444 | 4/1974 | United Kingdom . |
| 1407966 | 10/1975 | United Kingdom . |
| 1492712 | 11/1977 | United Kingdom . |
| 1553973 | 10/1979 | United Kingdom . |
| 2161560 | 1/1986 | United Kingdom . |
| 2167821 | 6/1986 | United Kingdom . |

*Primary Examiner*—Matthew C. Graham
*Attorney, Agent, or Firm*—Stevens, Davis, Miller & Mosher

[57] ABSTRACT

A laminated friction disc and method of construction in which a layer (11) of carbon composite material which provides a wear surface is secured against a second layer (12) of material with said wear surface facing away from said second layer of material, holes (16) being formed in each of the layers either before or after the layers are arranged against one another with the holes in the layer of carbon composite material extending through said wear surface and aligned with the holes in the second layer, fastening means (15), such as rivets, being positioned to extend through aligned pairs of holes and arranged to secure the layers against one another with each of the fastening means lying wholly below and spaced from at least the wear surface of the layer of carbon composite material.

12 Claims, 3 Drawing Sheets

CARBON COMPOSITE LAMINATED STRUCTURE

This invention relates to a method of constructing a carbon composite laminated structure in the form of a friction disc of the kind comprising a layer of carbon composite material, such as a carbon-carbon composite material, having edge formations whereby the disc may slide axially relative to but remain rotationally fixed relative to a support structure (such as a structure associated with an axle or a wheel), and to a laminated structure resulting from the method. It relates in particular, though not exclusively, to a method of manufacture of a laminated structure for use at high temperatures, such as those experienced by the carbon-carbon composite rotor and stator friction discs of an aircraft brake assembly.

Friction discs of carbon composite material are extremely expensive to produce. Thus as well as seeking to maximise the wear life of such discs, strenuous efforts inevitably have been made to ensure that the maximum possible benefit is derived even from the material of fully worn discs.

The specification of GB-A-2167821 describes one known and now well established technique by which friction discs may be refurbished. This specification teaches that worn discs may be machined to half of the thickness of a new disc and that pairs of such machined discs may be united by a brazing technique thereby to result in a refurbished type of friction disc of a thickness corresponding to that of a conventional new disc.

The brazing technique is found to work well and the resulting refurbished discs exhibit good performance in use. However, the brazing technique is notable for requiring the use of specialised equipment. Despite this limitation, no viable alternatives have been proposed so far concerning any alternative and potentially more convenient techniques for refurbishing friction discs.

The subject invention seeks to provide an improved laminated structure in the form of a friction disc and method of constructing a laminated structure of a kind comprising a layer of carbon composite material.

In accordance with one aspect of the present invention a method of constructing a laminated friction disc comprises providing a first disc layer of carbon composite material which provides a wear surface and a second disc layer which also provides a wear surface and arranging said wear surfaces facing away from each other, each said layer of said disc having key formations whereby the disc may slide axially but remain rotationally fixed relative to a support structure, forming holes in each of said layers either before or after arranging said layers relative to one another with the holes in the first layer extending through said wear surface and with the holes in said second layer aligned with the holes in the first layer, positioning fastening means to extend through aligned pairs of holes and arranging said fastening means to secure said layers relative to one other with each said fastening means lying wholly below and spaced from said wear surfaces.

Preferably the fastening means lie spaced wholly below said wear surface by a distance greater than the wear allowance of the disc. Thus the fastening means is below the wear surface at all times in subsequent normal use.

The invention further provides a method for increasing the effective thickness of a layer of carbon composite material of a friction disc by utilising for the second layer a layer which is also of carbon composite material.

More than two layers may be laminated together, in which case individual fastening means may extend through either all or only fewer than all the layers. Some fastening means may serve to connect together some of a plurality of layers and other fastening means may act between one or some of those layers and the other layers of the plurality.

The invention may be employed to laminate together two layers of corresponding shape and size in a manner in which confronting surfaces of the layers are wholly in contact with one another. Alternatively it may be employed to laminate two components of different shape and size in a manner in which the confronting surfaces of the two components are not wholly in contact. Thus a layer of an annular shape, such as that of a brake friction disc, may be formed by assembling together a plurality of segments into an annular form and overlaying with a second plurality of segments in a manner in which the segments in the second layer are offset circumferentially from those in the first layer.

The layer of carbon composite material and the second layer, whether or not of carbon composite material, may be of equal thickness or one may be thicker than the other.

A layer of a material other than carbon-carbon composite material may be sandwiched as a core layer between two layers of carbon-carbon material.

The invention further provides a laminated friction disc comprising a layer of carbon composite material which provides a wear surface and a second layer of material which also provides a wear surface and is held relative to the layer of carbon composite material by fastening means which, as viewed in a direction perpendicular to the wear surface, lies within the area of said wear surface at a position wholly below said surface and each said layer having key formations whereby the disc may slide axially but remain rotationally fixed relative to the support structure.

The invention provides that preferably the fastening means shall be of a material which does not readily form a carbide for example a metal for which the free energy of formation of carbides is positive, and including an alloy of any such metal. Suitable materials include nickel or cobalt, alloys thereof and nickel based or cobalt based alloys such as Nimonic, e.g. Nimonic 75. These materials have a good ability to withstand high temperatures and thermal shock loads. Other suitable materials for withstanding a high temperature include ceramics though the resistance of many ceramics to thermal shock is not high. Preferred ceramic materials include silicon carbide and carbon-carbon. These have a favourable combination of mechanical and physical properties for thermal shock resistance.

The fastening means may be in the form of a dowel pin, i e of simple cylindrical shape, and secured in position by means of adhesives and/or by virtue of surface texturing of the cylindrical surface. Suitable adhesives include phenolic resins which are subsequently charred by heating to a high temperature. Suitable surface texturing includes longitudinally extending ribs (i.e. spline-like formations) and circumferentially extending formations such as annular barb-like ribs.

Although the fastening means may be comprised by for example a dowel pin, more preferably it is in the form of a rivet. The fastening means may be a hollow or a solid type rivet. In this case, and in the case of other fastening means having a head type formation, the outer surface i.e. wear surface of the carbon composite layer may be recessed in the vicinity of the holes thereby to accommodate the rivet head or deformed rivet tail in a manner in which it lies below the wear surface of the carbon composite layer.

A particularly suitable type of rivet is considered to be one of the kind which is solid in cross-section in the vicinity of its head portion and hollow in cross-section in the vicinity of its tail portion. It is further preferred that the rivet is not of the conventional kind having a uniform cylindrically shaped external surface, but is one having a waisted external shape around a substantial proportion of the length of the hollow portion. Preferably the waisted portion is selected so as to lie, when the rivet is in situ in the holes of the layers, and prior to deformation of its tail portion, such that the waisted portion is aligned axially with that surface against which the tail portion is to be deformed. The risk of damage to material of the layer against which the tail portion is deformed, particularly when of carbon composite material, is believed thereby to be significantly reduced.

In the case of fastening means having a head and/or a tail portion between which the layers of the laminated friction disc are secured said head and/or tail portions may be arranged to act on the layers substantially only in direct compression.

It is further taught by the subject invention that in the case of fastening means of the kind having head and tail portions between which the layers of the laminated friction disc are secured, e.g. by clamping, load distribution means such as an annular washer be provided so that a head or tail portion does not directly make contact with a confronting load bearing surface of one of the layers of the laminated friction disc. Suitable materials for the load bearing means include nickel, cobalt and alloys comprising one or both of these materials. For many uses it is preferred that the load distribution means and the fastening means are of the same material. The load distribution means may have a planar surface for contact with a layer of carbon composite material or it may have a non-planar, e.g. a frusto-conically shaped surface for confronting a rivet tail or a rivet head of the countersunk type.

Preferably the fastening means are provided within a band covering the middle 80% of the radial width of an annular wear area.

In a disc in which said layers are co-axially arranged the fastening means may be arranged for example all to lie on a common pitch circle or to lie at at least two pitch circle radii. The holes for the fastening means may lie on a pitch circle radius equal to the inner diameter of the wear surface plus at least 50% of the difference between the inner and outer radii of the wear surface; said pitch circle radius may be less than the sum of the inner radius of the wear surface and three-quarters of the difference between the inner and outer radii of the wear surface.

Preferably at least some of the fastening means lie at a radius at least that of the average of the radii of the inner and outer boundaries of the annular wear area of the friction disc. More preferably fastening means lie at a position which is outwards of said inner diameter by at least 50 but less than 75% of the difference between said inner and outer diameters.

The friction disc may be of an asymmetric configuration in which the layer of carbon composite material is of a thickness different from that of said second layer. For example in a two layer construction the layers may be 45 and 55% respectively of the total thickness.

The invention is believed to be particularly useful in the use of one or more layers of carbon composite material which are of carbon-carbon composite material.

Embodiments of the present invention will now be described, by way of example only, with reference to the accompanying diagrammatic drawings in which.

A laminated carbon-carbon composite brake rotor disc 10 comprises two annular layers 11,12 of carbon-carbon composite material each formed from worn brake discs which have been machined as necessary to 50% of the thickness of the brake to be constructed by the method of this invention. The disc 10 is a rotor disc having outer key formations of conventional kind though it will be appreciated that the invention is equally applicable to stators.

Figure 1:
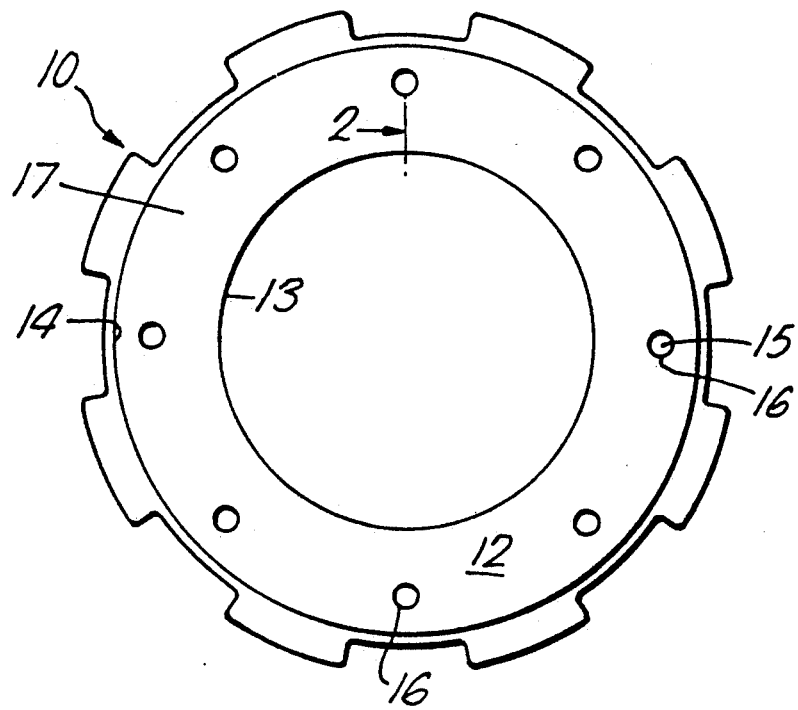
FIG. 1 is a face view of part of a carbon-carbon composite brake friction disc in accordance with the present invention.
Figure 2:
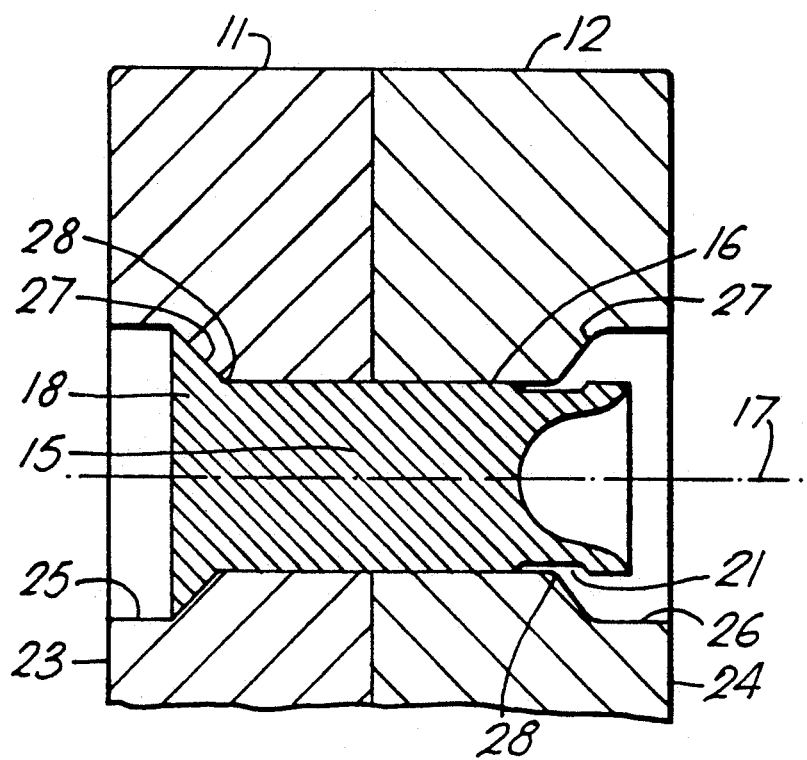
FIG. 2 is a section on the line 2—2 of FIG. 1 and prior to deformation of the rivets.

In FIG. 1 the radially inner and outer boundaries of the disc wear surface are indicated by the reference numerals 13 and 14 respectively.

The two layers 11,12 are secured together in a manner that resists their separation by means of eight fastening means in the form of rivets 15. The rivets 15 are located in respective holes 16 uniformly circumferentially spaced about the disc on a pitch circle radius 17 which equals that of the inner boundary 13 plus two-thirds of the difference between the inner and outer boundaries 13,14.

Figure 3:
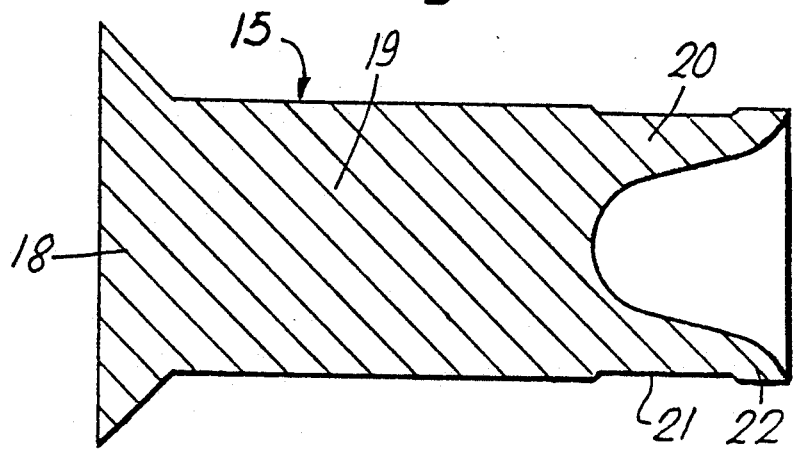
FIG. 3 is a longitudinal sectional view of a rivet for use in a brake disc of FIGS. 1 and 2.

Each rivet 15, prior to deformation, has the shape shown in FIG. 3. Notably it comprises a flat countersunk type head portion 18, a solid cross-section stem portion 19 of cylindrical shape and a hollow cross-section tail portion 20. The tail portion has a waisted external profile comprising a waist region 21 which extends over approximately 75% of the axial length of the hollow tail portion. Over the remaining 25% of its axial length, and being at the distal end of the hollow portion, the external surface 22 is of a cylindrical shape and corresponds in diameter with that of the stem portion 19.

The holes 16 in the layers 11,12 are each formed at the exposed surfaces 23,24 of the disc with recesses 25,26. The bases 27 of the recesses are frusto-conically shaped. The axial dimension of each rivet 15 is selected such that when it is arranged to lie in a pair of aligned holes 16 with the discs 11,12 clamped together for riveting, the waist portion 21 is axially aligned (and extends axially to each side of) the radially inner edge 28 of the frusto-conical shaped surface 27.

Figure 4:
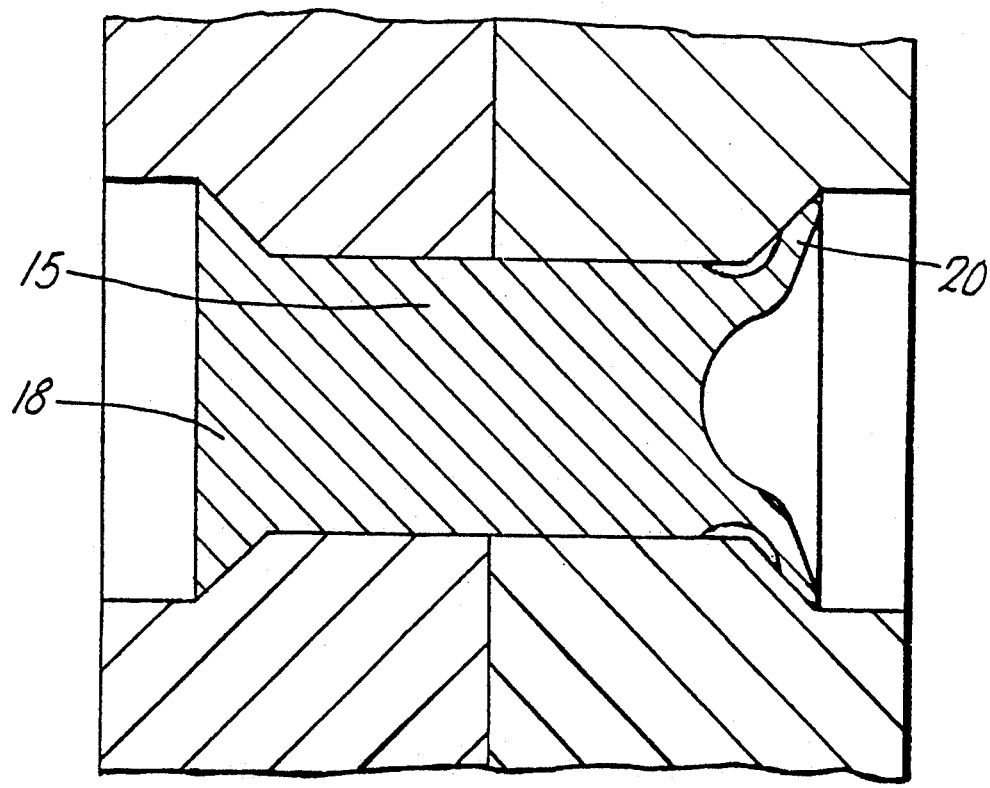
FIG. 4 shows the rivet of FIG. 3 when in situ and deformed.

Subsequent to deformation of the rivets they each adopt the cross-sectional form shown in FIG. 4. From this it will be seen that by virtue of the waist regions 21 each rivet will lie clear of an aforementioned edge 28 despite deformation of the tail portion, and the risk of damage to the layers 11,12 by virtue of undue shock loading is thereby avoided or substantially reduced.

It is not essential to use rivets of the aforementioned shape as shown in FIG. 3. As an alternative solid or completely hollow type rivets may be used.

Figure 5:
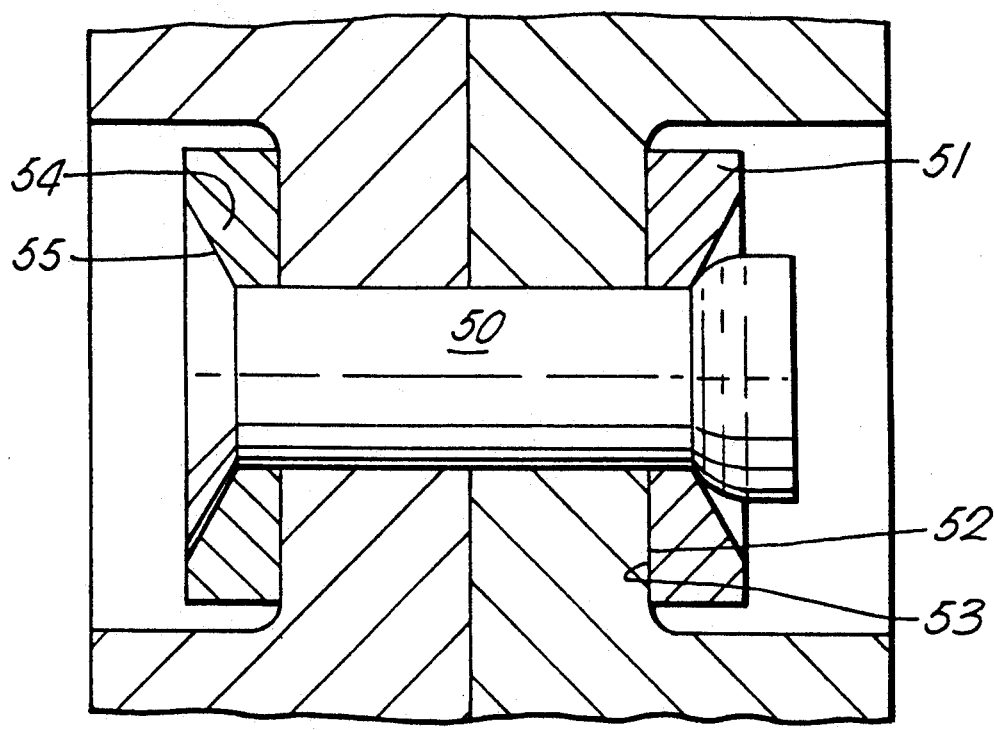
FIGS. 5 and 6 are cross-sectional views corresponding to that of FIG. 2 of two other embodiments of the present invention.
Figure 6:
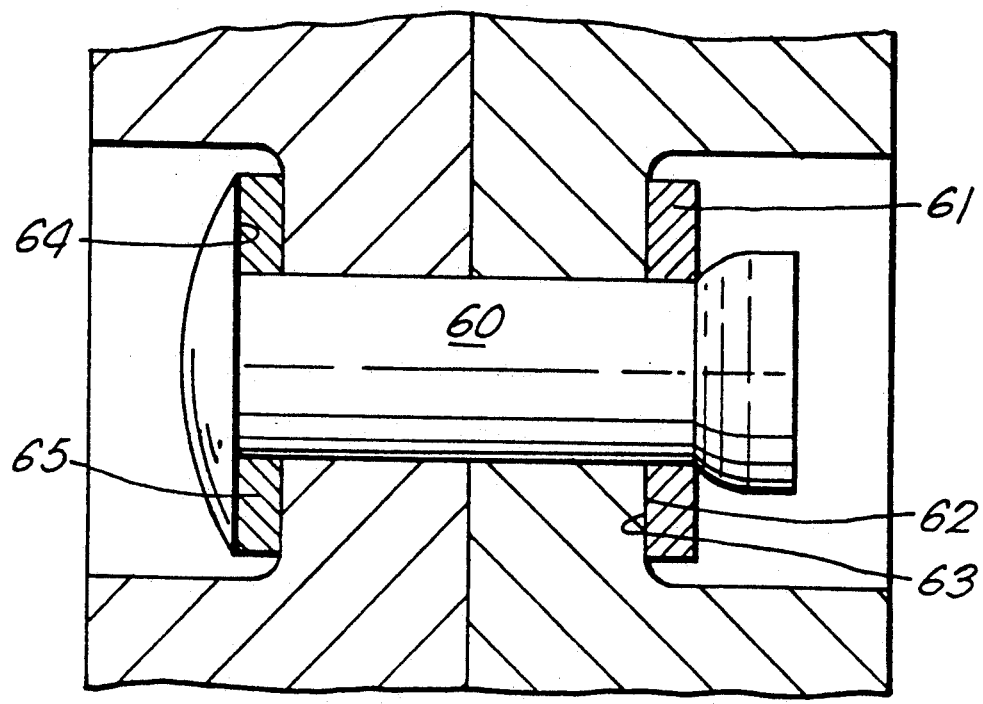

FIGS. 5 and 6 show rivets 50,60 which have been deformed to hold together two adjacent machined layers of carbon composite material. Because these rivets do not possess waisted end regions use is made of washers 51,61 to distribute load transmitted between the ends of the rivets and the layers. The washers each have planar surfaces 52,62 for bearing against planar annular end faces of the recesses 53,63.

FIG. 5 shows a rivet 50 having a flat countersunk head and FIG. 6 shows a rivet 60 having a round head. In the FIG. 5 case a washer 54 has a countersunk region 55 for abutment by the countersunk type head of the rivet. The washer 54 thus corresponds with washer 51. In the FIG. 6 case rivet 60 has a round head with a planar annular rear face 64. The head washer 65 is thus of a simple flat disc type and corresponds with washer 61.

I claim:

1. Method of constructing a two ply laminated friction disc from a pair of refurbished worn brake discs comprising providing a first disc layer of carbon composite material which provides a first wear surface and a second disc layer of carbon composite material which provides a second wear surface and arranging said layers in contact with one another with the wear surfaces thereof facing away from each other, each said layer of said disc having an annular wear area and torque transmitting key formations enabling the disc to slide axially but remain rotationally fixed relative to a support structure, forming holes in each of said layers either before or after arranging said layers relative to one another with the holes in the first layer extending through said first wear surface, at least some of said holes being provided at radial positions equal to the inner diameter of the wear area plus more than 50% of the difference between the inner and outer radii within a band covering the middle 80% of the radial width of the annular wear area and with the holes in said second layer extending through said second wear surface and aligned with the holes in the first layer, positioning fastening means to extend through aligned pairs of holes and arranging said fastening means to hold said layers securely together with each said fastening means lying wholly below and spaced from said wear surfaces, with said fastening means comprising rivets of a kind inherently adapted to withstand and in use be subject to tensile loads.

2. Method according to claim 1 wherein use is made of carbon composite material which is a carbon-carbon composite material.

3. Method according to claim 1 wherein use is made of fastening means comprising a metal which does not form a carbide.

4. Method according to claim 1 wherein use is made of rivets comprising a hollow tail portion and a substantially solid cross-section stem portion.

5. Method according to claim 4 wherein the tail portions of the rivets are deformed against said layer of carbon composite material.

6. Method according to claim 4 wherein at least one of said rivets is of a kind having a waisted external shape around a substantial proportion of the length of the hollow portion.

7. Method according to claim 6 wherein said at least one rivet is positioned to extend through an aligned pair of holes with said waisted portion axially aligned with the surface against which the tail portion is to be deformed.

8. Method according to claim 1 wherein use is made of fastening means of a material comprising nickel.

9. Method according to claim 1 wherein use is made of fastening means of a material comprising cobalt.

10. A laminated friction disk fabricated from a refurbished pair of worn brake discs comprising a first layer of carbon composite material which provides a first wear surface and a second layer of carbon composite material which provides a second wear surface and a plurality of holes extending therethrough with each said layer having an annular wear surface and wherein the second layer is held securely in contact with and against a surface of the first layer of carbon composite material opposite said first wear surface by fastening means extending through aligned pairs of said holes which, as viewed in a direction perpendicular to the wear surfaces, lies within the area of said wear surfaces at radial positions equal to the inner diameter of the wear area plus more than 50% of the difference between the inner and outer radii of the annular wear area at a position wholly below the said wear surfaces and each said layer having torque and transmitting key formations whereby the disc may slide axially but remain rationally fixed relative to a support structure, with the fastening means comprising rivets of a kind inherently adapted to withstand and in use be subject to tensile loads.

11. A laminated friction disc according to claim 10 wherein said layers are co-axially arranged, the fastening means being arranged all to lie on a common pitch circle.

12. A laminated friction disc according to claim 10 wherein said pitch circle radius lies at a radius less than the sum of the inner radius of the wear surface and three-quarters of the difference between the inner and the outer radii of the wear surface.

* * * * *